(No Model.) 2 Sheets—Sheet 1.
C. A. FOREMAN.
TURBINE WATER WHEEL.
No. 560,350. Patented May 19, 1896.
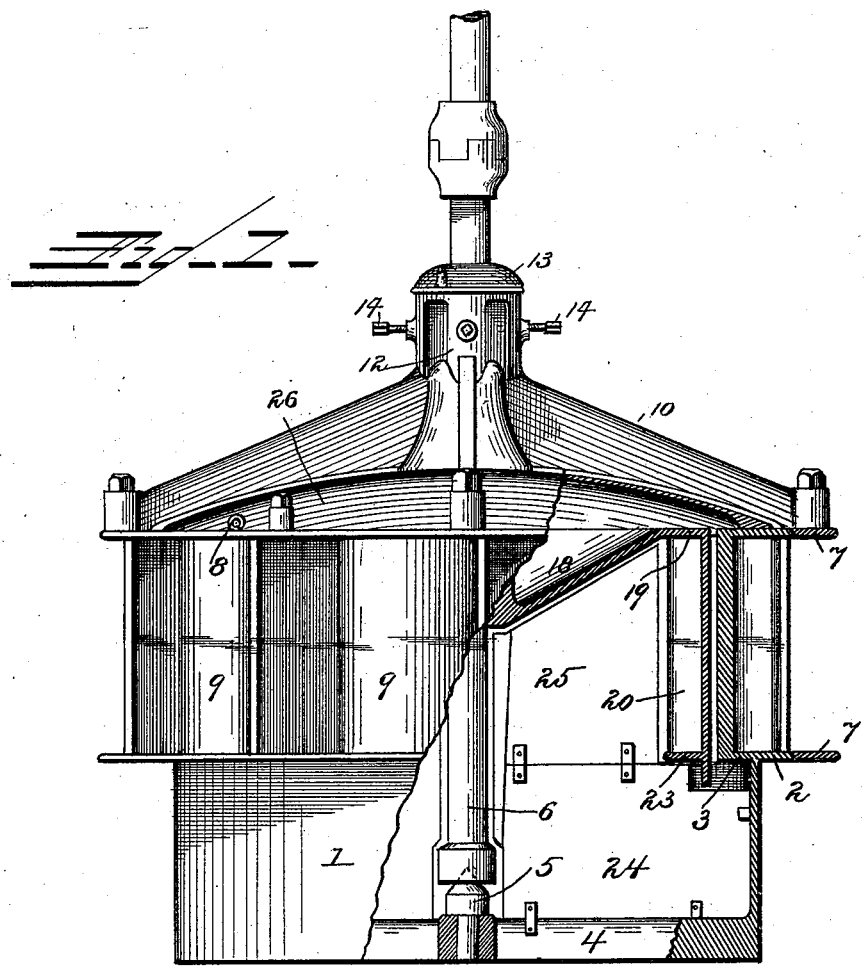
Witnesses
F. L. Ourand
E. A. Browne
Inventor
Charles A. Foreman,
By S. A. Bircusa,
Attorney (No Model.) 2 Sheets—Sheet 2.
C. A. FOREMAN.
TURBINE WATER WHEEL.
No. 560,350. Patented May 19, 1896.
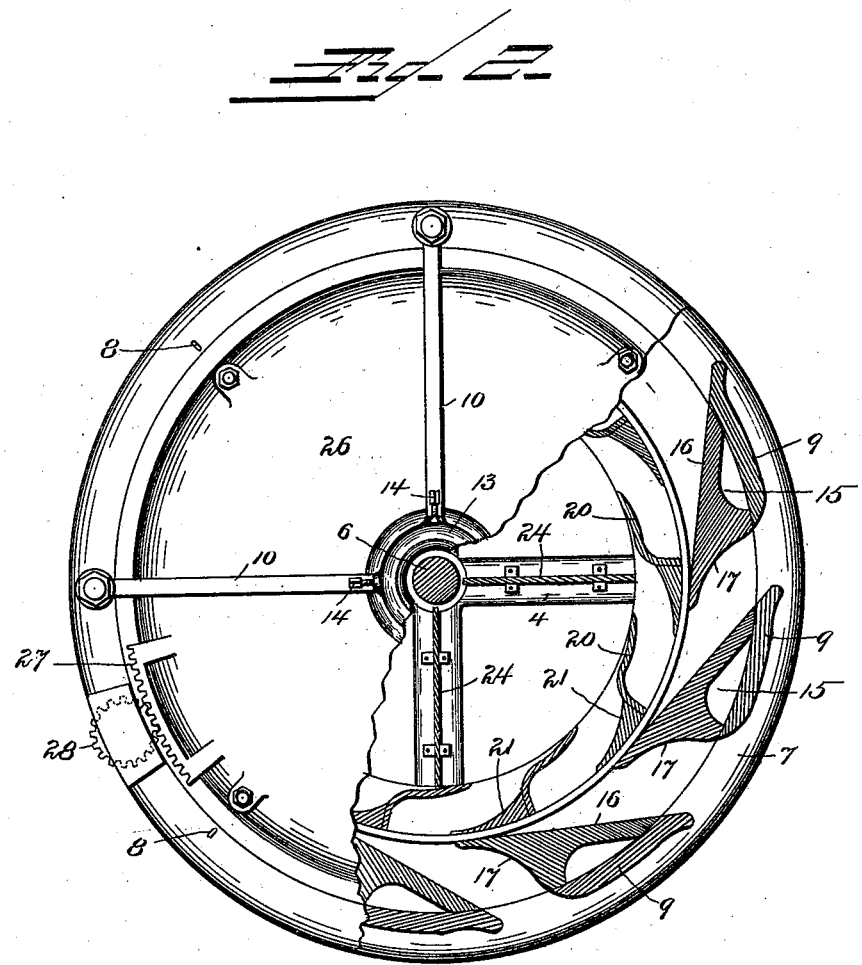
Witnesses
H. L. Ourand
E. A. Browne
Inventor
Charles A. Foreman,
By H. B. Willson.
Attorney

UNITED STATES PATENT OFFICE.

CHARLES A. FOREMAN, OF CHAMBERSBURG, PENNSYLVANIA.

TURBINE WATER-WHEEL.

SPECIFICATION forming part of Letters Patent No. 560,350, dated May 19, 1896.

Application filed September 30, 1895. Serial No. 564,125. (No model.)

*To all whom it may concern:*

Be it known that I, CHARLES A. FOREMAN, a citizen of the United States, residing at Chambersburg, in the county of Franklin and State of Pennsylvania, have invented certain new and useful Improvements in Turbine Water-Wheels; and I do declare the following to be a full, clear, and exact description of the invention, such as will enable others skilled in the art to which it appertains to make and use the same.

My invention relates to improvements in turbine water-wheels; and its object is to provide an improved construction of the same which shall possess superior advantages with respect to efficiency in operation.

The invention consists in the novel construction and combination of parts hereinafter fully described and claimed.

In the accompanying drawings, Figure 1 is an elevation, partly in section, of a wheel constructed in accordance with my invention. Fig. 2 is a plan view of the same, partly in section.

In the said drawings the reference-numeral 1 designates a draft-tube, having at its upper end an annular outwardly-extending flange 2 and an inwardly-extending annular flange 3. This draft-tube at its lower end is formed or provided with a spider 4, having a step-bearing 5 for the lower end of the driving-shaft 6.

The numeral 7 designates an outer casing consisting of an upper and a lower ring connected together by rods or bars 8 and provided with curved plates 9. The upper ring is secured to a spider 10, formed with a bushing 12, in which are located four (more or less) segment-blocks of wood, which form a bearing for the driving-shaft. A cover 13 closes the top of the bushing and holds the blocks in place, and by means of set-screws 14, bearing upon the blocks, the driving-shaft may be centered.

The numeral 15 designates a number of chutes, between which are formed the chutes for the ingress of the water. These plates have their inner faces inclined or beveled, as seen at 16, and their rear sides curved, as seen at 17.

The numeral 18 designates a cone-shaped hub keyed to the driving-shaft and formed with an annular flange 19 at the periphery. Formed with this flange is a series of curved buckets 20, extending inwardly and then rearwardly, and at the front of these buckets are curved blades 21. These blades and runners are formed at their lower ends with an annular flange 23. The hub, buckets, and ring constitute the runner or wheel proper, which rotates in the same direction in which the water flows through the chutes. By the peculiar form of the chutes, buckets, and blades I not only effect a great saving in weight of metal, consequently in cost, but produce a construction which will be found very efficient in operation.

Formed with or secured to the spider at the lower end of the draft-tube are a number of vertical plates 24, and to the upper ends thereof are bolted the lower ends of corresponding plates 25. These plates 25 are made small enough to give a clearance of an inch (more or less) from the inner part of the runner-buckets, the cone-shaped hub, and the shaft. The object of these plates is to prevent the water from tailing in the direction opposite from which the runner moves and thus to gain power to the runner from this properly deflected and directed water, which is vented from the runner-chamber (the space between the buckets) by its striking against these plates.

In use the wheel is set in a penstock in the usual manner, the draft-tube extending through a hole therein into the tail-race. The outer casing can be moved so as to open and close the chute-openings. The water will enter through the chute-openings and will rush forwardly until it strikes the buckets, which will turn the runner and cause the driving-shaft to be rotated.

The plates or blades for preventing rotation of the water opposite to the movement of the wheel have their meeting ends cut away to form a clearance for the buckets.

The numeral 26 designates a lid which covers the opening in the inner casing and supports the spider with outside casing attached.

A rack 27 and pinion 28, fastened to the inner casing and operated by a gate-rod, move the outer casing back and forward to open and close the chute-openings.

The different casings and runners are bored out and turned off true in the usual manner.

Having thus described my invention, what

I claim, and desire to secure by Letters Patent, is—

1. In a turbine water-wheel, the combination of the outer casing, the inner stationary casing, the buckets, the blades in front thereof, the cone-hub, the driving-shaft, the draft-tube, the spider 4, formed with radial plates, the upper vertical plates, and fastening means at the meeting edges of the upper and lower plates to hold them in alinement and together.

2. In a turbine water-wheel, the combination with the draft-tube, the spider and the lower vertical plates formed therewith, of the runner, and the upper vertical plates bolted to said lower plates, substantially as described.

In testimony whereof I affix my signature in presence of two witnesses.

CHARLES A. FOREMAN.

Witnesses:
JOHN L. BURL,
ISABELLA J. POMEROY.